United States Patent Office 3,478,590
Patented Nov. 18, 1969

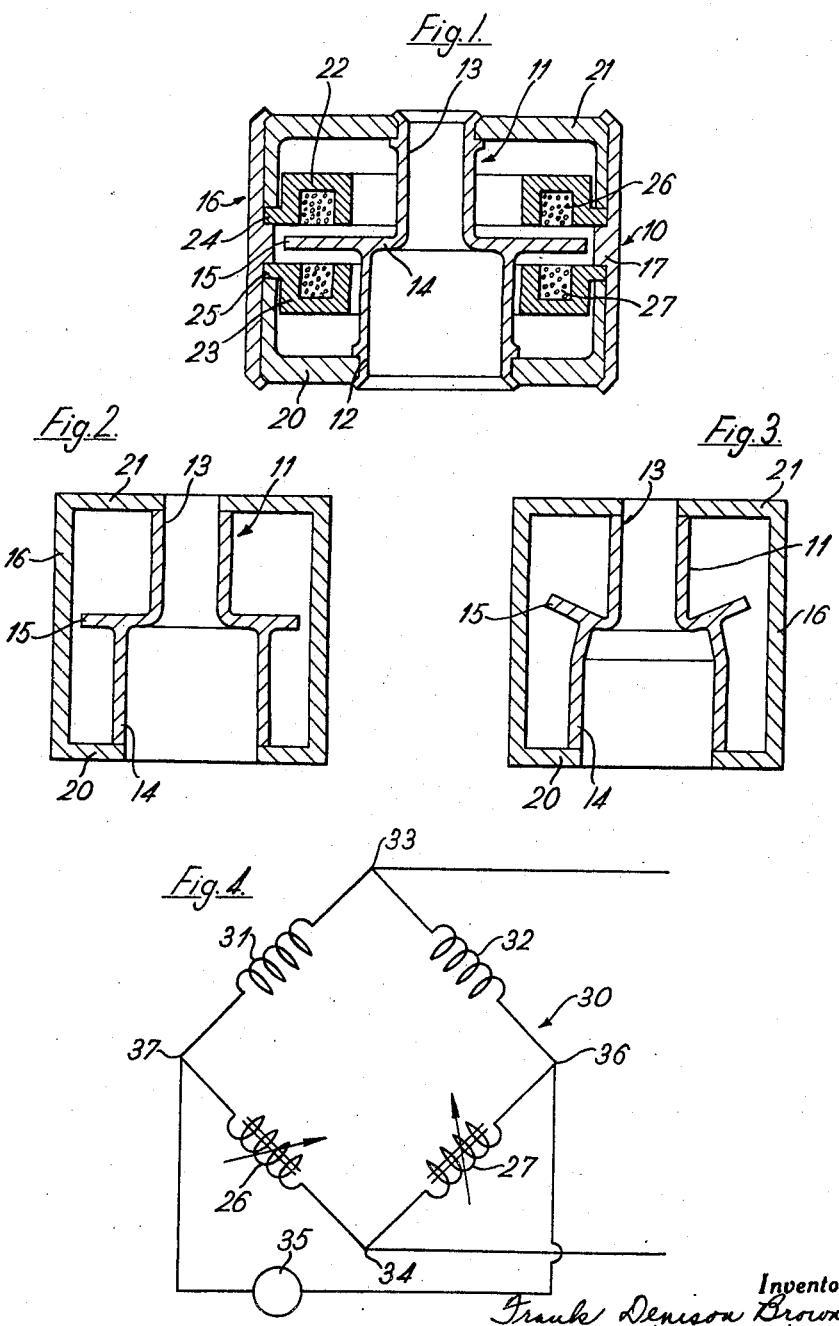

3,478,590
TEMPERATURE SENSING DEVICE
Frank D. Brownhill, Chaddesden, Derby, and Michael K. Walker, Wilford, England, assignors to Rolls-Royce Limited, Derby, England, a British company
Filed June 21, 1967, Ser. No. 647,689
Int. Cl. G01k 5/18, 5/48, 5/52
U.S. Cl. 73—363                                    13 Claims

ABSTRACT OF THE DISCLOSURE

A temperature sensing device for sensing the temperature of a gas stream comprises a conduit through which the gas stream may flow. The conduit has an external flange arranged between the two coils. The position of the flange with respect to the coils depends on the temperature of the gas, and thus the inductances of the coils also depend on this temperature.

---

This invention concerns a temperature sensing device for sensing the temperature of a gas stream.

According to one aspect of the present invention, there is provided a temperature sensing device comprising a conduit through which a gas stream may flow, two similar electrical components, the conduit having an external flange located at a junction between a relatively large and relatively small diameter portion of the conduit, so that the position of the flange with respect to the electrical components depends on the temperature of the conduit, the position of the flange controlling the relative values of the said components in dependence upon said temperature, and means responsive to said relative values.

In another aspect the invention provides a temperature sensing device comprising a conduit through which a gas stream may flow, two similar electrical coils coaxially mounted about the conduit and axially spaced from each other, a ferromagnetic member disposed between the coils and extending radially from the conduit externally thereof so that its position with respect to the electrical coils depends upon the temperature of the conduit, the position of said member controlling the relative inductances of the coils in dependence upon said temperature, and means responsive to the said relative inductances.

In a yet further aspect the invention provides a temperature sensing device comprising a conduit through which a fluid may flow, the conduit having a relatively larger diameter portion, a relatively smaller diameter portion axially joined to said larger diameter portion and an external flange which is located at the junction between said relatively large and relatively small diameter portions, restraining means to restrict said axially joined portions of said conduit on opposite sides of said flange against relative axial movement, said flange being deflected upon a change in temperature of said conduit, and means for sensing said deflection.

The invention is illustrated, merely by way of example, in the accompanying drawings, in which:

FIGURE 1 is a cross section through a temperature sensing device according to the present invention, FIGURES 2 and 3 are purely diagrammatic representations of the said device and showing the relative positions of parts thereof when the device is respectively hot and cold, and FIGURE 4 is a circuit diagram.

Referring to the drawings, a temperature sensing device 10 comprises a conduit 11 through which a hot gas stream may flow. The conduit 11 is formed of a ferromagnetic material which has a relatively high co-efficient of expansion, e.g. soft iron.

The conduit 11 has a relatively large diameter portion 12, which forms an inlet portion of the conduit, and a relatively small diameter portion 13, which forms an outlet portion of the conduit. The portions 12, 13 are interconnected at a shoulder 14.

The conduit 11 is integrally provided with an external annular flange 15 which is located at the junction between the portions 12, 13 and therefore forms an extension of the shoulder 14.

The conduit 11 is mounted within a housing 16. The housing 16 comprises a substantially cylindrical member 17 and annular end members 20, 21 which are secured, e.g. by welding, to opposite ends of the cylindrical member 17. The cylindrical member 17 and the end members 20, 21 are formed of a material such, for example, as "Invar" (registered trademark) having a relatively low coefficient of expansion.

The end members 20, 21 are secured to opposite ends of the conduit 11. Accordingly, if the temperature of the conduit 11 changes, relative axial movement of the opposite ends of the conduit 11 is restricted by the end members 21, 20, and the flange 15 will therefore be bent into a position which will be characteristic of the temperature of the conduit 11.

This is illustrated diagrammatically in FIGURES 2 and 3. Thus FIGURE 2 illustrates the positions of the parts when cold, and it will be seen that, in this condition, the flange 15 extends parallel to the end members 20, 21. FIGURE 3, however, which illustrates the positions of the parts when hot, shows that since axial expansion of the conduit 11 has been restricted, the flange 15 has been forced into a position in which it is no longer parallel to the end members 20, 21.

Disposed on opposite sides of the flange 15 are annular channel members 22, 23. The annular channel members 22, 23 are provided on their radially outer sides with flanges 24, 25 respectively. The flange 24 is trapped between the cylindrical member 17 and the end member 21, while the flange 25 is trapped between the cylindrical member 17 and the end member 20. Coils 26, 27 are respectively located in the channel members 22, 23.

It will thus be appreciated that as the temperature of the conduit 11 changes, so the position of the flange 15 changes correspondingly, and this will involve a change in the inductances of the coils 26, 27 in dependence upon the temperature of the conduit 11.

As will be seen from FIGURE 4, the coils 26, 27 form adjacent arms of a Maxwell bridge circuit 30 whose other arms are provided by coils 31, 32, having equal inductances.

An electrical supply is adapted to be connected between the corners 33, 34 of the bridge circuit 30, while a device 35 is connected between the other corners 36, 37 of the bridge circuit 30. The device 35 will thus be responsive to the relative values of the inductances of the coils 26, 27. The device 35 may be calibrated to indicate the temperature of the conduit 11 and thus by inference that of a hot gas stream passing therethrough, and/or it may be arranged to control a part, e.g. a switch, in dependence upon the said temperature, e.g. in dependance upon whether the temperature is above or below a certain value.

We claim:

1. A temperature sensing device comprising a conduit through which a gas stream may flow, two similar electrical components, an external flange located at a junction between a relatively large and a relatively small diameter portion of said conduit so that the position of said flange with respect to said electrical components depends on the temperature of said conduit, the position of said flange controlling the relative values of said components in dependence upon said temperature, and means responsive to said relative values of said components, thereby indicating the temperature of said conduit.

2. A temperature sensing device as claimed in claim 1 in which said two similar electrical components are coils and in which the means responsive to the said relative values comprises a bridge circuit of which the said coils form a part.

3. A temperature sensing device as claimed in claim 1 in which means are provided for restricting relative movement of axially spaced parts of said conduit when the temperature of said conduit changes, the said axially spaced parts being disposed on opposite sides of said flange, whereby as the said temperature changes the flange will be bent into different positions.

4. A temperature sensing device as claimed in claim 3 in which the said axially spaced parts are connected to a device which has a lower coefficient of expansion than that of the said conduit.

5. The temperature sensing device defined in claim 1, wherein said means responsive to said relative values is for controlling an external means in response to temperature variation.

6. The temperature sensing device as claimed in claim 1, wherein said electrical components are coils which are coaxially mounted about said conduit.

7. A temperature sensing device as claimed in claim 6, in which said coils are disposed on opposite sides of said external flange, said flange being a ferromagnetic flange for controlling the relative values of the inductances of said coils.

8. A temperature sensing device comprising a conduit through which a fluid may flow, the conduit having a relatively larger diameter portion, a relatively smaller diameter portion axially joined to said larger diameter portion and an external flange which is located at the junction between said relatively large and relatively small diameter portions, restraining means to restrict said axially joined portions of said conduit on opposite sides of said flange against relative axial movement, said flange being deflected upon a change in temperature of said conduit, and means for sensing said deflection.

9. A temperature sensing device as claimed in claim 8, wherein said restraining means comprises a device having a lower coefficient of expansion than said conduit.

10. A temperature sensing device as claimed in claim 9, wherein said restraining means device is a tubular member concentric with the conduit and having radially extending flanges engaging the ends of said conduit.

11. A temperature sensing device as defined in claim 8, having in addition two similar electrical components with said flange extending between said components, the position of said flange relative to said components depending on the temperature of the conduit and controlling the relative values of the components, and means responsive to said values.

12. A temperature sensing device comprising a conduit through which a gas stream may flow, two similar electrical coils coaxially mounted about said conduit and axially spaced from each other, a ferromagnetic member disposed between said coils and extending radially from said conduit externally thereof so that the position of said ferromagnetic member with respect to said coils is dependent upon the temperature of said conduit, the position of said ferromagnetic member controlling the relative inductances of said coils in dependence upon said temperature and means for measuring the relative inductances of said coils, thereby indicating the temperature of said conduit.

13. A temperature sensing device as defined in claim 12, comprising a pair of annular channel members into each of which respective ones of said coils have been wound, each channel having an open radially extending face through which the respective coil was introduced into said channel member.

References Cited

UNITED STATES PATENTS

| 1,938,929 | 12/1933 | Petersen | 73—363.5 XR |
| 2,293,502 | 8/1942 | Hermann | 73—362 XR |
| 2,981,106 | 4/1961 | Knudsen et al. | 73—362 XR |
| 1,578,112 | 3/1926 | Ernst | 73—363 |
| 1,999,053 | 4/1935 | Kingsland | 236—91 |
| 3,173,067 | 3/1965 | Wright | 335—217 |

LOUIS R. PRINCE, Primary Examiner
WILLIAM A. HENRY II, Assistant Examiner

U.S. Cl. X.R.

73—362